Jan. 16, 1951  G. H. KEYES ET AL  2,538,009
PHOTOGRAPHIC MATERIAL CONTAINING DIALKYLAMINOBENZYLIDENE FILTER DYE
Filed Sept. 24, 1949
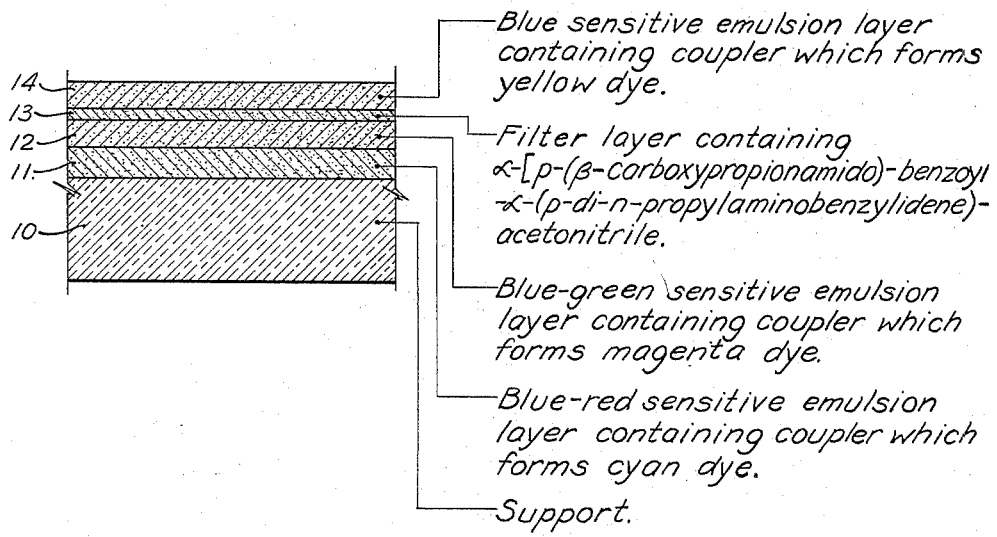
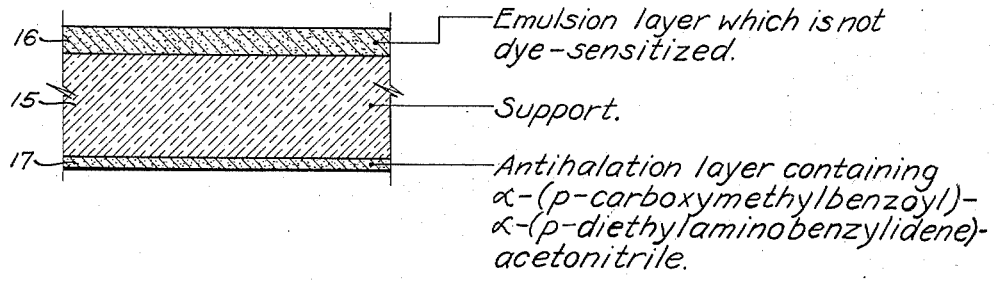
GRAFTON H. KEYES
ARTHUR H. HERZ
LESLIE G. S. BROOKER
INVENTORS
BY Daniel I. Mayne
Claude G. Schmitt
ATTORNEYS

UNITED STATES PATENT OFFICE 2,538,009

PHOTOGRAPHIC MATERIAL CONTAINING DIALKYLAMINOBENZYLIDENE FILTER DYE

Grafton H. Keyes, Arthur H. Herz, and Leslie G. S. Brooker, Rochester, N. Y., assignors to Eastman Kodak Company, Rochester, N. Y., a corporation of New Jersey Application September 24, 1949, Serial No. 117,710

9 Claims. (Cl. 95—8)

This invention relates to a photographic material containing a dialkylaminobenzylidene filter dye.

A number of dyes have been proposed for the preparation of filter layers in photographic elements. However, but a relatively few of these dyes are completely satisfactory, because the dyes are not completely and permanently bleached during the developing process. In many cases, there remains a more or less strong coloration, or the coloration reappears, or is strengthened during the subsequent drying.

Examples of dyes which do not bleach completely during the developing process are those dialkylaminobenzylidene dyes which can be represented by the following general formula:

I
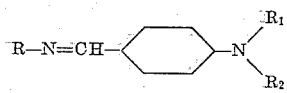

II
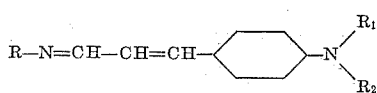

and

III
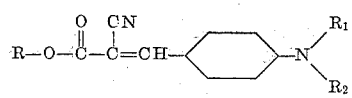

wherein $R_1$ and $R_2$ each represents an alkyl group and R represents any monovalent organic radical.

We have now found that dialkylaminobenzylidene dyes which can be represented by the following general formula:

IV
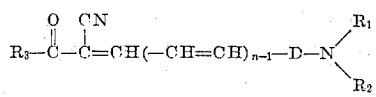

wherein D represents a p-arylene group of the benzene series, $R_1$ and $R_2$ each represents an alkyl group, and $R_3$ represents an aryl group of the benzene series, bleach readily when photographic materials comprising the dyes are processed in solutions containing sulfites.

It is, accordingly, an object of our invention to provide photographic materials provided with filter dyes which are completely and permanently bleached during the photographic developing process. A further object is to provide a process for preparing such photographic materials. Other objects will become apparent hereinafter.

In accordance with our invention, we prepare photographic silver halide materials containing one or more of the dyes represented by Formula IV above. These dyes can be dispersed in a suitable colloid, e. g. gelatin, gum arabic, casein, the calcium salt of polyglycuronic acid, etc., and the dispersion employed as a separate filter layer to prevent substantially the transmission of blue light. Such a separate filter layer can be coated on top of a single emulsion layer or can be positioned between two or more emulsion layers. The dispersion can also be mixed with and made an integral part of an emulsion layer. The dyes of Formula IV wherein $n$ represents one are especially in connection with filter layers employed in color photographic materials.

Dispersions of the aforesaid dyes of Formula IV can also be employed as an antihalation backing for photographic materials containing silver halide emulsions which are not spectrally (optically sensitized) or as an overcoat for correcting color balance of photographic color film.

The dyes of Formula IV above which are especially useful can be represented by the following general formula:

V
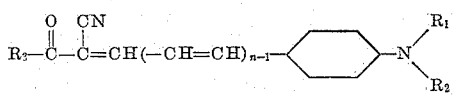

wherein $R_1$ and $R_2$ have the values given above and $R_3$ represents an aryl group of the benzene series containing in addition to carbon atoms no atoms other than hydrogen, oxygen, sulfonamido sulfur atoms, sulfonamido nitrogen atoms, and carboxamide nitrogen atoms. In all cases the $R_1$ and $R_2$ groups are advantageously primary alkyl groups of the formula $C_mH_{2m+1}$ wherein $m$ represents a positive integer of from 1 to 4, i. e. methyl, ethyl, n-propyl, isobutyl and n-butyl. The $R_3$ group advantageously contains one or more hydroxyl groups, one or more carboxyalkyl groups, e. g. carboxymethyl, one or more carboxyacylamino groups, e. g. β-carboxypropionamido, carboxybenzamido, β-carboxyacrylamido, γ-carboxybutyramido, etc. The $R_3$ group can contain acylamino groups, e. g. acetamido, propionamido, isobutyramido, etc.; alkylsulfonamido groups, e. g.

methylsulfonamido, ethylsulfonamido, n-propylsulfonamido, n-butylsulfonamido; or arylsulfonamido groups, e. g. phenylsulfonamido, p-tolylsulfonamido, etc.

The following examples will further demonstrate the practice of our invention.

*Example 1*

50 g. of α-[p-(β-carboxypropionamido)benzoyl] - α - (p-di-n-propylaminobenzylidene)acetonitrile having the formula:

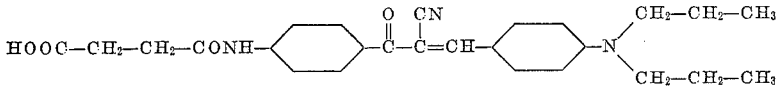

were dissolved in one liter of water containing 10 g. of sodium hydroxide. This solution was added slowly, with stirring, to a dispersion of one pound of gelatin in 9 lbs. of water, at 40° C. Immediately after the addition of the dye, 4.3 liters of a 1% (by weight) water solution of lead acetate, $Pb(OOCCH_3)_2 \cdot 3H_2O$, were added to the dye gel, with vigorous stirring. The gel was then chilled until rigid, shredded and washed in cold running water, until no lead sulfide could be detected in the wash water upon testing with sodium sulfide. With the wash completed, the rigid gelatin dispersion was remelted and made up to 30 lbs. weight with water. The resulting dispersion when coated over an area of 1000 sq. ft. either on top of one or between two or more emulsion layers, will transmit not more than 1% of the incident light of wavelength 450 mμ.

In general a coating of the above concentration can be used as a separate filter layer to prevent the blue-red and blue-green sensitive layers of a multi-layer color photographic material from exposure by blue light. The employment of such a coating in multi-layer color photographic materials is further illustrated in the accompanying drawing which shows in Fig. 1 a transparent cellulose acetate support 10 on which is coated a blue-red sensitive silver halide layer 11 containing dispersed therein a coupler which forms cyan dye. Coated on the blue-red sensitive emulsion layer 11 is a blue-green sensitive silver halide emulsion layer 12 containing dispersed therein a coupler which forms magenta dye. Coated on the blue-green sensitive layer 12 is a yellow filter layer 13 containing α-[p-(β-carboxypropionamido)benzoyl] - α - di - n - propylaminobenzylidene)acetonitrile. Coated on the yellow filter layer is a blue sensitive silver halide emulsion layer 14 containing dispersed therein a coupler which forms yellow dye. When such a photographic material was employed there was no noticeable loss in green or red speed in the blue-green and blue-red sensitive emulsions. The blue-sensitive emulsion was affected only by elimination of blue light reflection from the under layers and support. The yellow filter layer bleached completely in the normal processing; it was only necessary that a moderate concentration of sulfite and alkali be present in one or more of the usual processing solutions. Typical multi-emulsion photographic materials in which our filter dispersions can be employed are described in United States Patents 1,055,155, dated March 4, 1913; 2,304,940, dated December 15, 1942, and 2,322,027, dated June 15, 1943, and 2,322,006, dated June 15, 1943.

The dye dispersion described in Example 1 can be mixed with a blue-sensitive silver halide emulsion which is then coated on a blue-green sensitive emulsion layer which is in turn coated on a blue-red sensitive emulsion layer. Such a combination also serves to protect the blue-green and blue-red sensitive layers from exposure to blue light.

A coating of concentration of yellow dye such as that given in Example 1 above can also be employed as an integral filter coated as a layer on a photographic silver halide emulsion used for black and white photography, e. g. aerial photography.

A gelatin dispersion of the dye given in Example 1 above can be employed as an antihalation backing for a photographic silver halide emulsion which is not dye-sensitized.

A gelatin dispersion of the dye of Example 1 can also be employed as an overcoat for correcting color balance of photographic color film. When used for this purpose or when employed as an antihalation layer, the concentration of the dye in the overcoat or antihalation layer can ordinarily be smaller than the concentration given in Example 1 above, e. g. one-half, one-third, one-tenth or even one-twentieth of the above concentration.

*Example 2*

26.5 g. of α-(p-di-n-propylaminobenzylidene)-α - (p - phenyl - sulfonamidobenzoyl)acetonitrile which has the following formula:

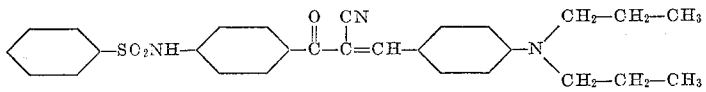

were dissolved in 150 cc. of methanol and 450 cc. of 1% aqueous sodium hydroxide solution. This dye solution was added at 40° C. to one pound of gelatin which had been previously dissolved in 10 lbs. of water. The gel was then made up with water to a total weight of 30 lbs. Before coating as in Example 1, the gel was adjusted with 2 N sulfuric acid to a pH of 5.0.

*Example 3*

23 g. of α-(p-carboxymethylbenzoyl)-α-(p-diethylaminobenzylidene)acetonitrile having the formula:

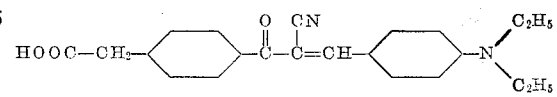

were dissolved in 15 cc. of pyridine and 650 cc. of ethanol. This dye solution was added simultaneously with 25 g. of polyvinylpyridine metho-p-toluenesulfonate (which had been previously dissolved in 2 liters of water) to 10 lbs. of a 10% (by weight) dispersion of gelatin in water. The mixture was then set by chilling, shredded and washed. The washed gel was melted and made up to 30 lbs. weight with water. It can be employed as a filter as described in Example 1.

In the accompanying drawing, in Fig. 2, a transparent cellulose acetate support 15 is shown coated with a photographic silver halide emulsion layer 16 which is not dye-sensitized. The under side of the support is coated with a gelatin layer 17 containing α-(p-carboxymethylbenzoyl)-α-(p-diethylaminobenzylidene)acetonitrile.

Example 4

To one pound of gelatin which had been dissolved in 10 lbs. of water, there were added 200 cc. of a 10% (by weight) solution of Alkanol B (an alkylnaphthalene sodium sulfonate manufactured by E. I. du Pont de Nemours & Co.). In a separate container, 17.5 g. of α-benzoyl-α-(p-diethylaminobenzylidene)-acetonitrile having the formula:

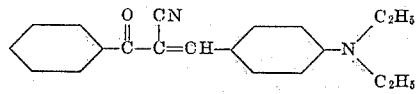

were dissolved in 500 cc. of di-n-butyl phthalate. This dye solution was added in a fine stream to the gelatin solution which was kept at 40° C., with vigorous agitation. The gelatin dye dispersion was then run through a colloid mill, until the dye solvent globules were well dispersed in the gelatin. The dispersion was then set by chilling, shredded and washed for 3 hours in running cold water. After this wash, the gelatin dispersion was melted and made up with water to give a total weight of 30 lbs. It can be employed as a filter as described in Example 1.

Example 5

To one pound of gelatin which had been dissolved in 10 lbs. of water, there were added 100 cc. of a 10% (by weight) solution of Alkanol B (an alkylnaphthalene sodium sulfonate manufactured by E. I. du Pont de Nemours & Co.). A solution of 32 g. of α-benzoyl-δ-(p-diethylaminophenyl)-2,4-pentadienoic nitrile having the formula:

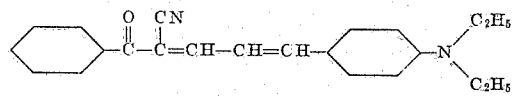

in 450 cc. of pyridine was added slowly, with stirring, to the above gelatin solution. The resulting mixture was chilled until rigid, washed for 2 hours with cold water to remove pyridine, remelted and made up to 30 lbs. weight with water. The resulting dispersion when coated over an area of 1000 sq. ft. will transmit not more than 1% of the incident light at 520 mμ. Such a dye dispersion can be employed, for example, as an antihalation layer for photographic materials comprising emulsions which are not dye-sensitized.

In a manner similar to that shown in the foregoing examples still other dyes of Formula IV can be employed in preparing photographic materials containing filters, e. g. α-[p-(o-carboxybenzamido)benzoyl] - α - (p-diethylaminobenzylidene) acetonitrile, α-[p-(β-carboxypropionamido) benzoyl]- α -(p - diethylaminobenzylidene) acetonitrile, α-(p-diethylaminobenzylidene) -α-(p-propionamidobenzoyl) acetonitrile, α-[p-(β-carboxypropionamido) -benzoyl]- α -(p-di-n-butylaminobenzylidene) acetonitrile, α-[p -(β-carboxyacrylamido) benzoyl]-α-(p-di - n - butylaminobenzylidene) acetonitrile, α-(p-di-n-propylaminobenzylidene) - α - (p-hydroxybenzoyl) acetonitrile, α -(p-diethylaminobenzylidene) - α - (3,4-dihydroxybenzoyl) acetonitrile, etc.

The dyes of Formula IV above can be prepared by condensing an aroylacetonitrile with a p-dialkylaminobenzaldehyde or a p-dialkylaminocinamaldehyde, in the presence of a secondary amine of the piperidine series, e. g. piperidine, 2-methylpiperidine, 3-methylpiperidine, etc. The dyes of Formula IV above wherein R₃ represents an aryl group containing an acylamino group are advantageously prepared by condensing an α-(p-aminobenzoyl) - α -(p - dialkylaminobenzylidene) acetonitrile or an α-(p-aminobenzoyl)-δ-(p-dialkylaminophenyl) -2,4-pentadienoic nitrile with an acyl chloride, in the presence of a heterocyclic base of the pyridine series. The dyes of Formula IV above wherein R₃ represents an aryl group containing an alkylsulfonylamino group or an arylsulfonylamino group are advantageously prepared by condensing an α-(p-aminobenzoyl)-α-(p-dialkylaminobenzylidene) acetonitrile or an α-(p-aminobenzoyl)- δ -(p-dialkylaminophenyl)-2,4-pentadienoic nitrile with an alkylsulfonyl chloride or an arylsulfonyl chloride, in the presence of a heterocyclic base of the pyridine series. The dyes of Formula IV above wherein R₃ represents an aryl group containing a carboxyacylamino group are advantageously prepared by condensing an α-(p-aminobenzoyl) -α-(p-dialkylaminobenzylidene) acetonitrile or an α-(p-aminobenzoyl)-δ-(p- dialkylaminophenyl) - 2,4 - pentadienoic nitrile with a carboxylic anhydride, in the presence of a heterocyclic base of the pyridine series. Such dyes containing a carboxyacylamino group are described in the copending application of Grafton H. Keyes and Leslie G. S. Brooker, Serial No. 117,709, filed of even date herewith.

The following examples will serve to illustrate the manner of preparing various of the dyes coming under Formula IV.

Example 6.—α-benzoyl-α-(p-diethylaminobenzylidene) acetonitrile

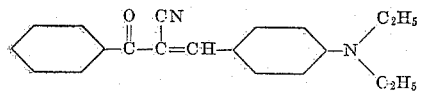

4.8 g. (1 mol.) of benzoylacetonitrile, 7.4 g. (1 mol.+25% excess) of p-diethylaminobenzaldehyde, 30 cc. of absolute ethyl alcohol and 2 drops of piperidine were refluxed together for a period of 4 hours. Upon chilling the reaction mixture, the dye separated. It was filtered off and twice recrystallized from methylalcohol and obtained as reddish crystals with a blue reflex, melting at 89° to 93° C.

Example 7.—α-(p-diethylaminobenzylidene)-α-(3,4-dihydroxybenzoyl) acetonitrile 1.8 g. (1 mol.) of 3,4-dihydroxybenzoylacetonitrile, (Sonn, Ber. 51, 1829 (1918)), 1.75 g. (1 mol.) of p-diethylaminobenzaldehyde, 30 cc. of absolute ethyl alcohol and 2 drops of piperidine were refluxed together for 3 hours. Upon addition of water to the cooled reaction mixture, the dye separated. It was filtered off and twice recrystallized from methyl alcohol and obtained as amber crystals having a blue reflex and melting at 168° to 170° C. with decomposition.

Example 8.— α-(p - di - n - propylaminobenzylidene) - α -(p-phenylsulfonamidobenzoyl) acetonitrile

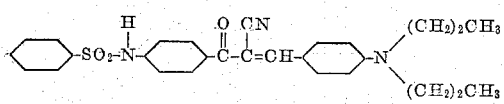

3.5 g. (1 mol.) of α-(p-aminobenzoyl)-α-(p-di-n-propylaminobenzylidene) acetonitrile, 1.8 g. (1 mol.) of benzenesulfonyl chloride and 15 cc. of pyridine were heated at steam bath temperature for one hour. The dye was precipitated from the reaction mixture upon adding water. The dye was filtered off and twice recrystallized from methyl alcohol. It was obtained as brownish-yellow crystals, melting at 204° to 206° C. with decomposition.

Using methanesulfonyl chloride or ethanesulfonyl chloride, α-(p-di-n-propylaminobenzylidene)-α-(p-methylsulfonamidobenzoyl)acetonitrile and α-(p-di-n-propylaminobenzylidene)-α-(p-ethylsulfonamidobenzoyl)acetonitrile can be similarly prepared.

The α-(p-aminobenzoyl)-α-(p-di-n-propylaminobenzylidene)acetonitrile employed in the above Example 8 can be prepared as follows:

8 g. (1 mol.) of p-aminobenzoylacetonitrile, 10.25 g. (1 mol.) of p-di-n-propylaminobenzaldehyde, 100 cc. of absolute ethyl alcohol and 4 drops of piperidine were refluxed together for a period of three hours. Upon chilling the reaction mixture, the dye separated. The dye was purified by two recrystallizations from methyl alcohol and obtained as brownish-orange crystals, melting at 148° to 150° C. with decomposition. Using p-diethylaminocinnamaldehyde, α-(aminobenzoyl)-δ-(p-diethylaminophenyl)-2,4-pentadienoic nitrile can be prepared in a similar manner.

*Example 9.—α-(p-diethylaminobenzylidene)-α-(p-propionamidobenzoyl) acetonitrile*

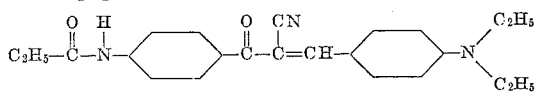

3.2 g. (1 mol.) of α-(p-aminobenzoyl)-α-(p-diethylaminobenzylidene)acetonitrile, 1.4 g. (1 mol.+50% excess) propionyl chloride and 15 cc. of pyridine were heated for 45 minutes at steam bath temperature. The dye was precipitated on addition of water to the cooled reaction mixture. It was filtered off and purified by two recrystallizations from methyl alcohol. It was obtained as bright orange crystals, melting at 186° to 188° C. with decomposition.

Using acetyl chloride or isobutyryl chloride, α-(p-diethylaminobenzylidene)-α-(p-acetamidobenzoyl)acetonitrile and α-(p-diethylaminobenzylidene)-α-(p-isobutryramidobenzoyl)acetonitrile can be similarly prepared.

The α-(p-aminobenzoyl)-α-(p-diethylaminobenzylidene)acetonitrile employed in the above Example 9 can be prepared as follows:

1.6 g. (1 mol.) of p-aminobenzoylacetonitrile, 1.75 g. (1 mol.) of p-diethylaminobenzaldehyde and 25 cc. of ethyl alcohol were heated under a reflux condenser. Two drops of piperidine were added to the mixture which was then refluxed for three hours. The dye separated on chilling the reaction mixture. It was filtered off and twice recrystallized from methyl alcohol and obtained as orange-brown crystals, melting at 144° to 147° C. with decomposition.

*Example 10.—α-(p-Carboxymethylbenzoyl)-α-(p-diethylaminobenzylidene)-acetonitrile*

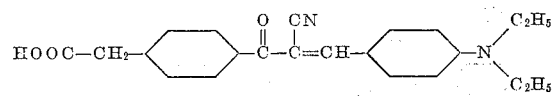

2 g. (1 mol.) p-cyanoacetylphenylacetic acid, 1.75 g. (1 mol.) of p-diethylaminobenzaldehyde, 25 cc. of ethyl alcohol and 2 drops of piperidine were refluxed together for a period of 3 hours. Upon chilling the reaction mixture, the dye separated. It was filtered off and twice recrystallized from ethyl alcohol. It was obtained as orange crystals, melting at 160° to 162° C. with decomposition.

The p-cyanoacetylphenylacetic acid employed in the above Example 10 was prepared as follows:

7.9 g. (1 mol.) of p-chlorophenylacetic acid (Kunckell, Ber. 41, 3046 (1908)) were dissolved in 50 cc. of ethyl alcohol and to this solution was added a solution of 12 g. (5 mol.) of potassium cyanide in 25 cc. of water; the resulting mixture was heated at steam bath temperature for 30 minutes. It was then chilled, made acid with hydrochloric acid and the p-cyanophenylacetic acid precipitated by adding 300 cc. of water. The precipitated product was filtered off, washed and dried.

*Example 11.—α-Benzoyl-δ-(p-diethylaminophenyl)-2,4-pentadienoic nitrile*

1.45 g. (1 mol.) of benzoylacetonitrile, 2 g. (1 mol.) of p-diethylaminocinnamaldehyde, 50 cc. of absolute ethyl alcohol and 2 drops of piperidine were refluxed together for 1½ hours. Upon chilling the reaction mixture, the dye separated. After two recrystallizations from methyl alcohol the dye was obtained as dull blue crystals, melting at 110° to 112° C.

*Example 12.—α-[p-(β-Carboxypropionamido)benzoyl]-α-(p-di-n-propylaminobenzylidene) acetonitrile*

3.5 g. (1 mol.) of α-(p-aminobenzoyl)-α-(p-di-n-propylaminobenzylidene)acetonitrile, 1.5 g. (1.5 mol.) of succinic anhydride and 15 cc. of pyridine were heated for a one-hour period at steam bath temperature. The reaction mixture was then poured into about 200 cc. of cold water. The reaction mixture was made acidic with hydrochloric acid, whereupon the dye separated. It was filtered off and twice recrystallized from methyl alcohol and obtained as orange crystals, melting at 184° to 186° C. with decomposition.

Typical photographic developers in which the dyes of our invention are bleached include for example Eastman Kodak Company's "D-76" developer which has the following composition:

| | |
|---|---|
| N-methyl-p-aminophenol sulfate _____lbs__ | 2 |
| Sodium sulfite, desiccated _____lbs__ | 100 |
| Hydroquinone _____lbs__ | 5 |
| Borax _____lbs__ | 2 |
| Water to make _____gal__ | 120 | and the photographic developers disclosed in United States 2,113,329, dated April 5, 1938.

Our filter dispersions can be employed in conjunction with any of the light-sensitive photographic silver halide emulsions, e. g. the gelatino-silver-bromoiodide, gelatino-silver-bromide, gelatino-silver-chlorobromide, gelatino-silver-chloride, gelatino-silver-chloroiodide, etc. The supports upon which such emulsions can be coated or otherwise positioned can be any of the usual supports, e. g. glass, cellulose acetate film, cellulose nitrate film, polyvinyl acetal resin film, nylon resin film, etc.

Where the dialkylaminobenzylidene dyes employed in our invention contain acid salt-forming groups, e. g. phenolic hydroxyl groups, carboxyl groups, sulfonamido groups, etc. either the free acid form or the salt form of the dyes can be employed. As illustrated in Example 1, alkali metal (e. g. sodium or potassium) salt forms can be made by dissolving the free acid form of the dye in water containing an alkali metal hydroxide. By treatment of a solution of such an alkali metal salt form with a solution of a salt of another metal, e. g. lead, the lead salt of the dye can be formed. Ammonium salt forms can be prepared by dissolving the acid dyes in ethyl alcohol containing ammonia, methylamine, diethylamine, triethylamine, ethanolamine, ethylenediamine, pyridine, piperidine, N-methylpiperidine, etc.

Polyvinyl pyridine metho-p-toluenesulfonate can be prepared by heating polyvinyl pyridine (2-vinylpyridine polymer) with methyl p-toluenesulfonate, in nitrobenzene, at about 190° C. for about 30 minutes, as described in the copending application of Robert H. Sprague and Leslie G. S. Brooker, Serial No. 719,624 (now United States Patent No. 2,484,430, dated October 11, 1949), filed December 31, 1946.

p-Aminobenzoylacetonitrile can be prepared as follows: 10 g. of p-chloroacetylaniline (Kunckell, Ber, 33, 2644 (1900)) were dissolved in 100 cc. of methyl alcohol. To this solution were added 19 g. of potassium cyanide dissolved in 50 cc. of water. A vigorous reaction took place. The reaction mixture was acidified with acetic acid, whereupon p-aminobenzoylacetonitrile separated out. It was filtered off and washed with water. Upon recrystallization from water, the compound was obtained as colorless crystals melting at 160° C.

What we claim as our invention and desire to be secured by Letters Patent of the United States is:

1. A light-sensitive photographic material containing a silver halide emulsion and a filter comprising a dispersion in a water permeable colloid of at least one dialkylaminobenzylidene dye selected from those represented by the following general formula:

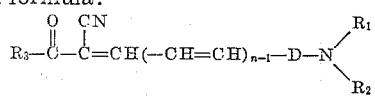

wherein D represents a p-arylene group of the benzene series, $n$ represents a positive integer of from 1 to 2, $R_1$ and $R_2$ each represents an alkyl group, and $R_3$ represents an aryl group of the benzene series, and the salt forms of such dyes which contain an acid salt-forming group.

2. A light-sensitive photographic material containing a silver halide emulsion and a filter comprising a dispersion in a water permeable colloid of at least one dialkylaminobenzylidene dye selected from those represented by the following general formula:

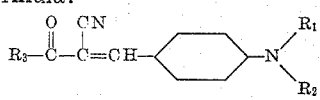

wherein $R_3$ represents an aryl group of the benzene series containing in addition to carbon atoms no atoms other than hydrogen atoms, oxygen atoms, sulfonamido sulfur atoms, sulfonamido nitrogen atoms and carboxamide nitrogen atoms, and $R_1$ and $R_2$ each represents a primary alkyl group of the formula $C_mH_{2m+1}$ wherein $m$ represents a positive integer of from 1 to 4, and the salt forms of such dyes which contain an acid salt-forming group.

3. A light-sensitive photographic material containing a silver halide emulsion and a filter comprising a dispersion in a water permeable colloid of at least one dialkylaminobenzylidene dye selected from those represented by the following general formula:

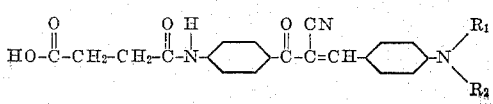

wherein $R_1$ and $R_2$ each represents a primary alkyl group of the formula $C_mH_{2m+1}$ wherein $m$ represents a positive integer of from 1 to 4, and the salt forms of such dyes.

4. A light-sensitive photographic material containing a silver halide emulsion and a filter comprising a dispersion in a water permeable colloid of at least one member selected from the group consisting of the dialkylaminobenzylidene dye represented by the following formula:

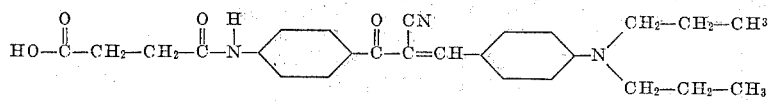

and the salt forms of such dyes.

5. A light-sensitive photographic material containing a silver halide emulsion and a filter comprising a dispersion in a water permeable colloid of at least one dialkylaminobenzylidene dye selected from those represented by the following general formula:

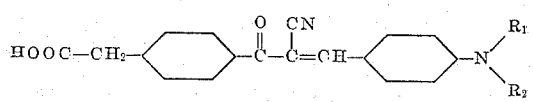

wherein $R_1$ and $R_2$ each represents a primary alkyl group of the formula $C_mH_{2m+1}$ wherein $m$ represents a positive integer of from 1 to 4, and the salt forms of such dyes.

6. A light-sensitive photographic material containing a silver halide emulsion and a filter comprising a dispersion in a water permeable colloid of at least one member selected from the group consisting of the dialkylaminobenzylidene dye represented by the following formula:

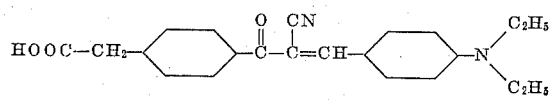

and the salt forms of such dye.

7. A light-sensitive photographic material containing a silver halide emulsion and a filter comprising a dispersion in a water permeable colloid of at least one dialkylaminobenzylidene dye selected from those represented by the following general formula:

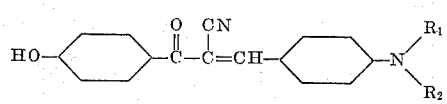

wherein $R_1$ and $R_2$ each represents a primary alkyl group of the formula $C_mH_{2m+1}$ wherein $m$ represents a positive integer of from 1 to 4, and the salt forms of such dyes.

8. A light-sensitive photographic material containing a silver halide emulsion and a filter comprising a dispersion in a water permeable colloid of at least one member selected from the group consisting of the dialkylaminobenzylidene dye represented by the following formula:

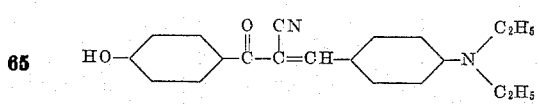

and the salt forms of such dye.

9. A light-sensitive photographic material comprising a support upon one side of which is positioned a silver halide emulsion layer which is not dye-sensitized, the opposite side of the support having an antihalation layer comprising a dispersion in a water permeable colloid of at least one dialkylaminobenzylidene dye selected from those represented by the following general formula:

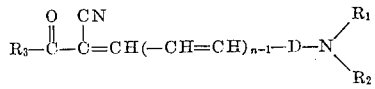

wherein D represents a p-arylene group of the benzene series, $n$ represents a positive integer of from 1 to 2, $R_1$ and $R_2$ each represents an alkyl group, and $R_3$ represents an aryl group of the benzene series, and the salt forms of such dyes which contain an acid salt forming group.

GRAFTON H. KEYES.
ARTHUR H. HERZ.
LESLIE G. S. BROOKER.

REFERENCES CITED

The following references are of record in the file of this patent:

UNITED STATES PATENTS

| Number | Name | Date |
|---|---|---|
| 2,036,546 | Schneider | Apr. 7, 1936 |
| 2,078,398 | Mannes et al. | Apr. 27, 1937 |
| 2,255,077 | Middleton | Sept. 7, 1941 |